United States Patent
Yebka et al.

(10) Patent No.: US 9,459,667 B2
(45) Date of Patent: Oct. 4, 2016

(54) HEAT SENSITIVITY OPTIMIZATION FOR BATTERY CELLS

(71) Applicant: Lenovo (Singapore) Pte. Ltd., Singapore (SG)

(72) Inventors: Bouziane Yebka, Apex, NC (US); Joseph Anthony Holung, Wake Forest, NC (US); Tin-Lup Wong, Chapel Hill, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 236 days.

(21) Appl. No.: 14/270,105

(22) Filed: May 5, 2014

(65) Prior Publication Data

US 2015/0318584 A1 Nov. 5, 2015

(51) Int. Cl.

| | |
|---|---|
| H01M 10/60 | (2014.01) |
| H01M 10/42 | (2006.01) |
| H01M 10/48 | (2006.01) |
| H01M 2/34 | (2006.01) |
| G06F 1/18 | (2006.01) |
| H01M 10/667 | (2014.01) |
| H01M 10/623 | (2014.01) |
| H01M 10/6553 | (2014.01) |
| H01M 10/637 | (2014.01) |
| H01M 2/30 | (2006.01) |
| H01M 10/654 | (2014.01) |
| H01M 2/02 | (2006.01) |
| H01M 10/052 | (2010.01) |

(52) U.S. Cl.
CPC ............... *G06F 1/18* (2013.01); *G06F 1/189* (2013.01); *H01M 2/30* (2013.01); *H01M 2/348* (2013.01); *H01M 10/4207* (2013.01); *H01M 10/486* (2013.01); *H01M 10/623* (2015.04); *H01M 10/637* (2015.04); *H01M 10/654* (2015.04); *H01M 10/6553* (2015.04); *H01M 10/667* (2015.04); *H01M 2/0212* (2013.01); *H01M 10/052* (2013.01); *H01M 2200/103* (2013.01); *H01M 2200/106* (2013.01)

(58) Field of Classification Search
CPC ......... H01M 10/486; H01M 10/4207; H01M 10/623; H01M 10/667; H01M 10/6553; H01M 10/637; H01M 2/348; H01M 2200/103; H01M 2200/106
See application file for complete search history.

(56) References Cited

U.S. PATENT DOCUMENTS

2013/0089755 A1* 4/2013 Park ..................... H01M 2/202
429/7

* cited by examiner

*Primary Examiner* — Brittany Raymond
(74) *Attorney, Agent, or Firm* — Ference & Associates LLC (57) ABSTRACT

An embodiment provides a battery cell, including: one or more contacts; a material providing output power to a device via the one or more contacts; and a tab element forming a part of a temperature cutoff mechanism; the tab element being thermally coupled to the material and conducting heat generated by the material; and the tab element being positioned proximate to a geometrically determined heat center. Other aspects are described and claimed.

23 Claims, 10 Drawing Sheets

HEAT SENSITIVITY OPTIMIZATION FOR BATTERY CELLS

BACKGROUND

Standard positive temperature coefficient (PTC) thermistor and temperature cut off (TCO) fuse arrangements are often inadequate for a variety of reasons. The temperature sensed with standard arrangements is often not representative of the actual internal temperature of the battery cell. This difference between the temperature of the battery cell, e.g., an internal temperature, and the temperature actually sensed may arise in a variety of ways. No matter the reason(s), the result is that an inaccurate temperature is sensed and this in turn may lead to difficulties in preventing critical thermal events, e.g., that lead to destruction of the battery cell or fire.

BRIEF SUMMARY

In summary, one aspect provides a battery cell, comprising: one or more contacts; a material providing output power to a device via the one or more contacts; and a tab element forming a part of a temperature cutoff mechanism; the tab element being thermally coupled to the material and conducting heat generated by the material; and the tab element being positioned proximate to a geometrically determined heat center.

Another aspect provides an apparatus, comprising: a battery cell; an input device; a processor; and a memory; wherein the memory, the input device and the processor are operatively coupled to the battery cell; the battery cell, comprising: one or more contacts; a material providing output power to an apparatus component via the one or more contacts; and a tab element forming a part of a temperature cutoff mechanism; the tab element being thermally coupled to the material and conducting heat generated by the material; and the tab element being positioned proximate to a geometrically determined heat center.

A further aspect provides a battery, comprising: a cell, including: one or more contacts; a material providing output power to a device via the one or more contacts; and a tab element forming a part of a temperature cutoff mechanism; the tab element being thermally coupled to the material and conducting heat generated by the material; and the tab element being positioned proximate to a geometrically determined heat center.

A still further aspect provides a battery pack, comprising: a plurality of battery cells, each cell including: one or more contacts; a material providing output power to a device via the one or more contacts; and a tab element forming a part of a temperature cutoff mechanism; the tab element being thermally coupled to the material and conducting heat generated by the material; and the tab element being positioned proximate to a geometrically determined heat center of a cell considering the arrangement of cells within the battery pack.

Another aspect provides a system, comprising: a battery pack; an input device; a processor; and a memory; wherein the memory, the input device and the processor are operatively coupled to the battery pack; the battery pack, comprising: a plurality of battery cells, each cell including: one or more contacts; a material providing output power to a component via the one or more contacts; and a tab element forming a part of a temperature cutoff mechanism; the tab element being thermally coupled to the material and conducting heat generated by the material; and the tab element being positioned proximate to a geometrically determined heat center of a cell considering the arrangement of cells within the battery pack.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3(A-B) illustrates example PTC/TCO configurations for example battery cells.

FIG. 4(A-C) illustrates example locations, positions, and dimensions for a tab element.

FIG. 5(A-E) illustrates example locations, positions, and dimensions for a tab element.

FIG. 6(A-D) illustrates example stacking and winding configurations and heat dissipations.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Standard PTC/TCO placement and construction results in inaccurate temperature sensing for a variety of reasons. For example, the volume change and loosening of the contact of the tab element to the battery cell throughout the life of the battery cell is often not factored in when choosing a PTC/TCO design. This may lead to partial displacement and lack of contact for the tab element, leading to a thermal decoupling.

As another example, the standard use of a thin aluminum tab element often leads to inaccurate temperature sensing. This can come about in a variety of ways, as further explained herein, but choice of tab element material and dimensions has an impact on the tab element's ability to conduct heat to where it needs to be sensed.

As another example, a short tab element is often employed that does not extend far enough towards the center of the battery cell to accurately sense heat. Similarly, it is common practice to locate the tab element external to the jellyroll. Each of these factors, either alone or together, may lead to significant inaccuracies due to inappropriate placement of the tab element with respect to a heat center of the battery cell.

There may also be thermal variations in transitioning between elements used for the PTC/TCO arrangements. For example, the transition between aluminum and copper elements in standard implementations leads to a temperature drop off In summary, many of the difficulties encountered center around PTC/TCO arrangements that do not take into account the particular geometry of the battery cell. If this is not taken into account when choosing the location, size and/or material composition of the PTC/TCO for a battery cell, these oversights, alone or a combination, make it difficult to accurately detect thermal events such that the same may be prevented.

Accordingly, various embodiments employ one or a combination of approaches that optimize the PTC/TCO arrangements (including other arrangements, e.g., MHP-TA (Metal Hybrid PPTC—Thermal Activation Device) and breakers) for the battery cell in order to enhance the functioning of these heat-sensing elements for the given application. For example, according to an embodiment, a battery cell provides a tab element that is positioned within the battery cell taking into account the geometry of the battery cell. This permits the tab element to be located proximate to a geometrically determined heat center.

Moreover, various embodiments also provide a variety of ways to achieve this proximate placement. For example, an embodiment may extend or shape the tab element to be proximate to the heat center. In an embodiment, the dimension of the tab element may be taken into consideration and selected to better conduct heat. Thus, a consideration of the length and width of the tab element may be leveraged for more accurate performance. Also in an embodiment, the material construction of the tab element and/or other elements forming the PTC/TCO may be purposely selected to avoid thermal variation and consequent drop off or decoupling such that heat conducted from the internal portion of the battery cell by the tab element may be faithfully conveyed to other components.

The illustrated example embodiments will be best understood by reference to the figures. The following description is intended only by way of example, and simply illustrates certain example embodiments.

Figure 1:
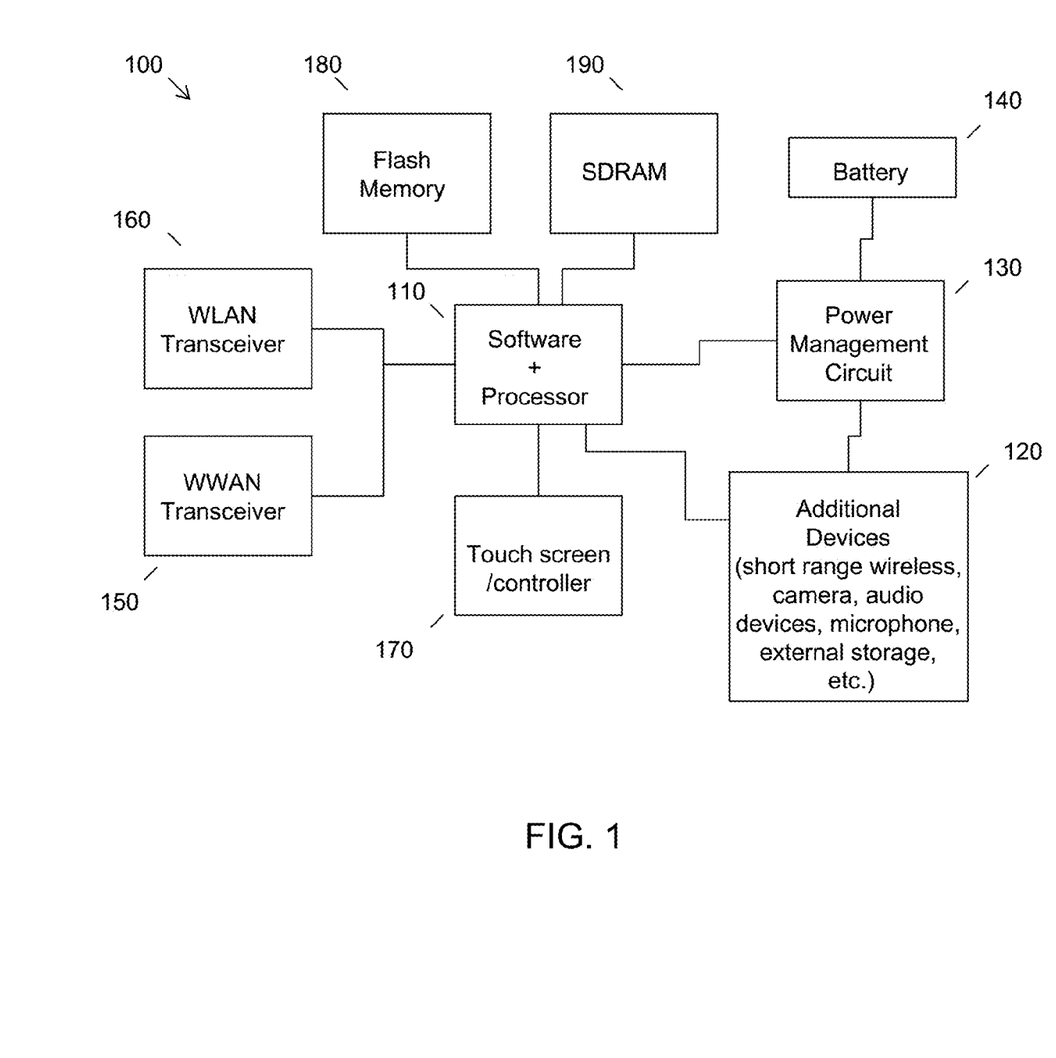
FIG. 1 illustrates an example of information handling device circuitry.

While various other circuits, circuitry or components may be utilized in information handling devices, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140 including one or more battery cells of the type described herein, which may be recharged by a connection to a power source (not shown). In some designs the BMU is included in the battery itself, although control of the cell(s) may be distributed or handled remotely (e.g., in connection with the system processor). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. Commonly, system 100 will include a touch screen/controller 170 for data input and display. System 100 also typically includes various memory devices, for example flash memory 180 and SDRAM 190.

Figure 2:
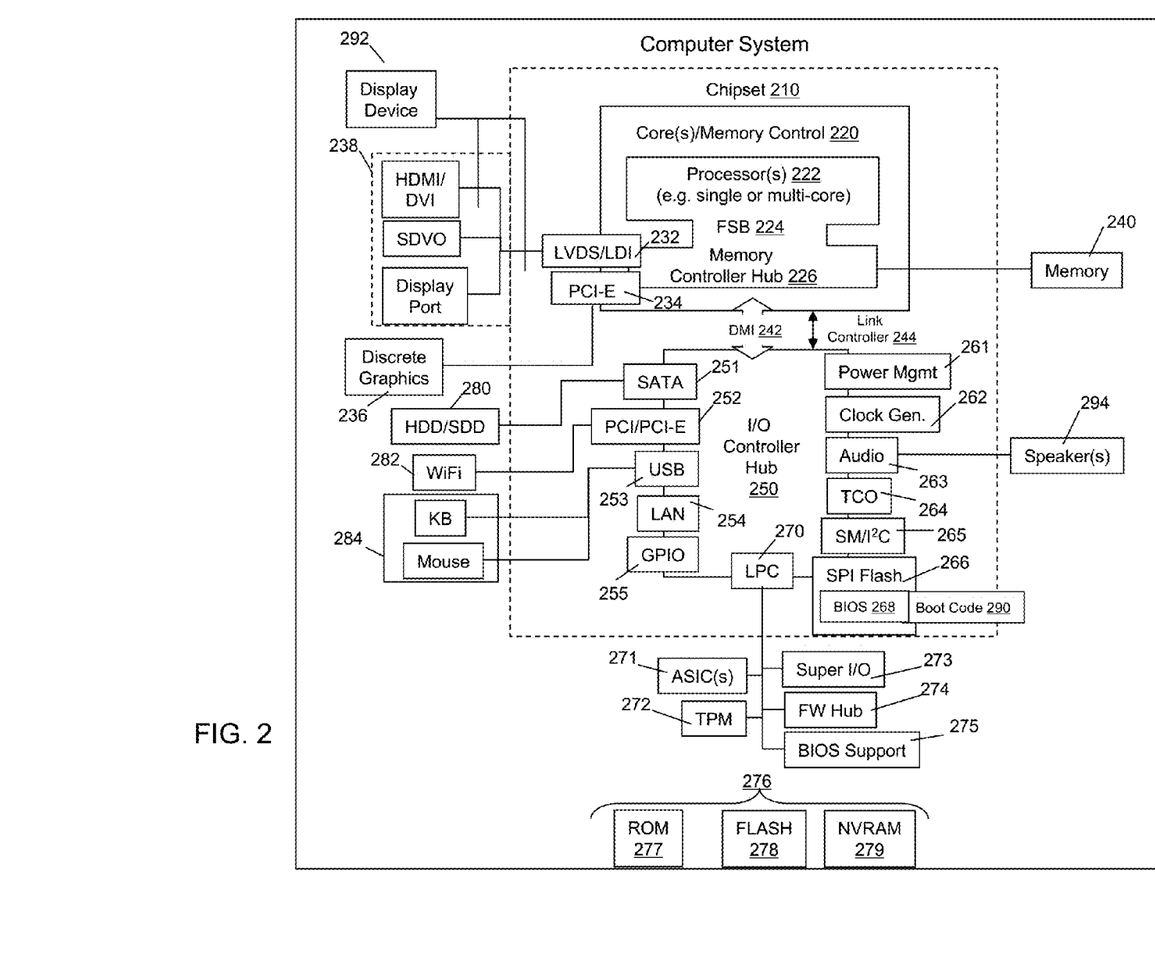
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits, or chips, that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, et cetera) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, sensors, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261 may manage power output and charging, e.g., as supplied via one or more battery cells of the type described herein, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that operate, e.g., in a mobile mode, by using power supplied from a rechargeable battery that includes one or more battery cells. The battery cell includes, as is known, a material that provides energy to terminals or contacts in the form of direct current that may be supplied to power device components such as those outlined in FIG. 1 and FIG. 2 or combinations thereof.

Figures 3A, 3B:
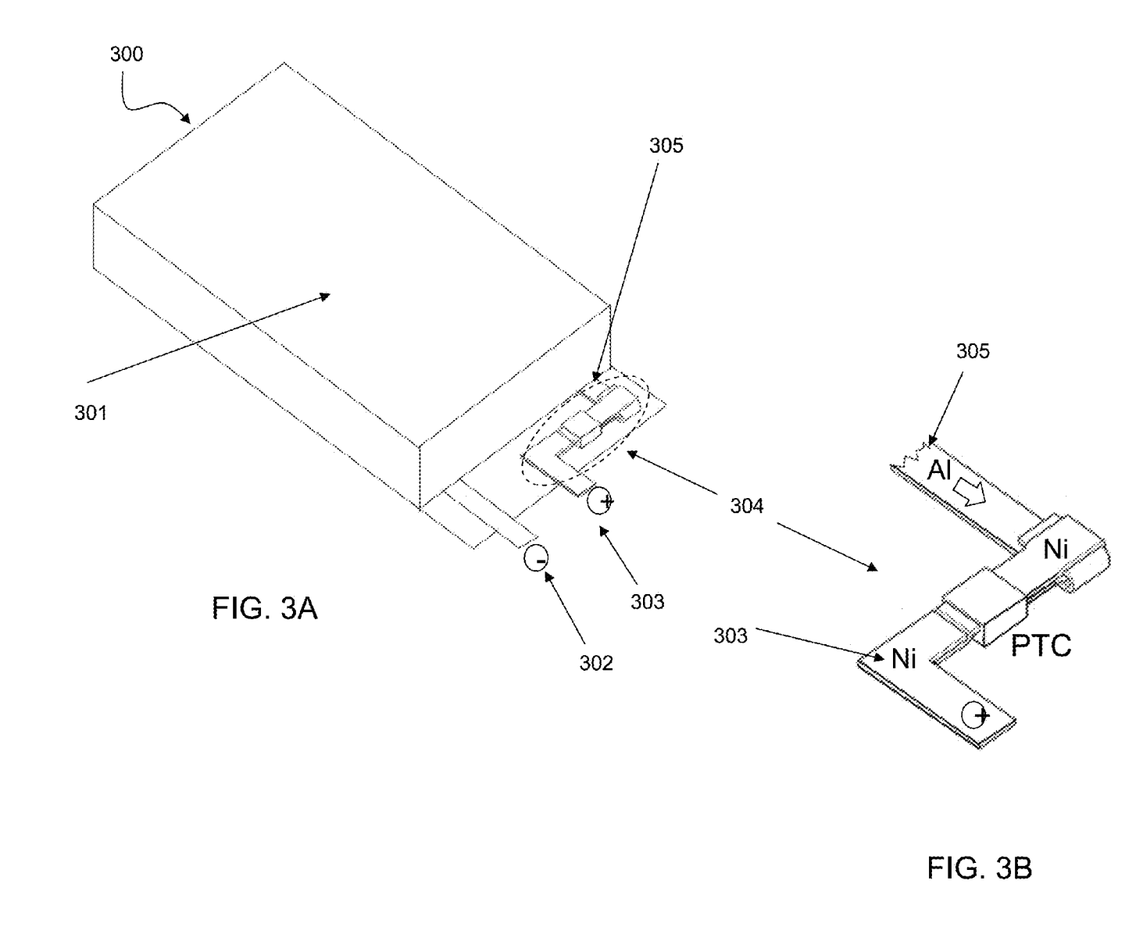

FIG. 3A for its part illustrates an example battery cell 300 (e.g., a pouch type battery or prismatic cell, etc., noting that these are non-limiting examples). It should be also noted that throughout the terms battery cell, cell, and battery are used interchangeably unless otherwise noted.

The battery cell 300 includes a central portion 301 that includes a material (e.g., Li-ion) that provides a rechargeable source for producing current for output to contacts or positive and negative terminals/tabs 302, 303, respectively. The battery cell 300 includes a PTC/TCO structure 304 (with the TCO fuse forming a part of the PTC assembly), as indicated in FIG. 3. A tab element 305 is conventionally included which extends a short way into the battery cell 300 internal portion 301 such that it may thermally couple the internal material's heat generation to the PTC/TCO 304. Thus, the tab element 305 permits the TCO fuse to operate if a temperature exceeds a predetermined threshold.

FIG. 3B illustrates an enlarged view of the PTC/TCO 304. Here it may be appreciated that it is standard practice to include a tab element 305 that is formed of aluminum whereas other components, e.g., the positive tab 303 are formed of nickel. Thus, there is a variation in the way these materials conduct heat and thus a difference in the amount of heat that is transmitted and sensed via tab at the PTC/TCO mechanism compared to a mechanism formed of a single material (or non-varying composite material).

Figure 4A:
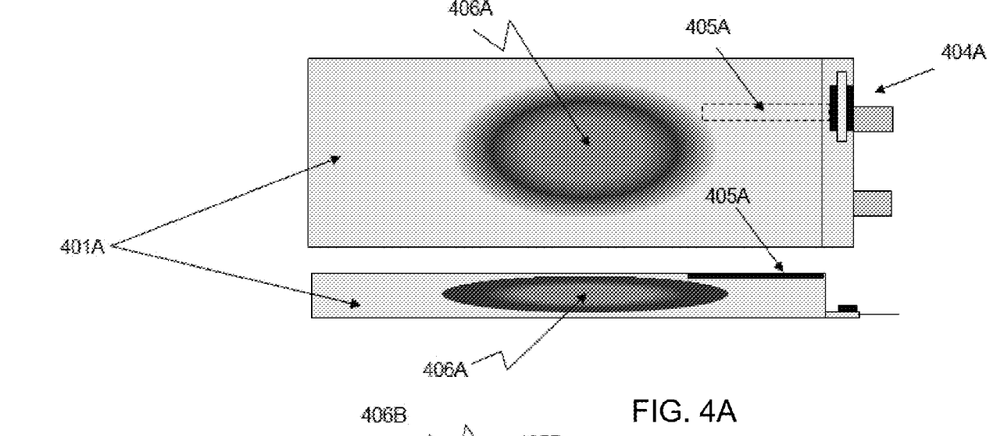

FIG. 4A illustrates plan and side views of a conventional PTC/TCO arrangement for an example cell geometry. In a conventional implementation, as illustrated in FIG. 4A, a tab element 405A does not extend far enough into the internal of the battery cell interior 401A to detect heat at a maximum level. This is because for this type of geometry, e.g., an elongated, thin pouch type cell, a maximum temperature is reached in the core of the internal material, whereas this heat dissipates as it reaches the outer periphery of the internal material. Thus, a conventional tab element 405A as illustrated in FIG. 4A will not accurately conduct heat to the PTC/TCO arrangement 404A.

Figure 4B:
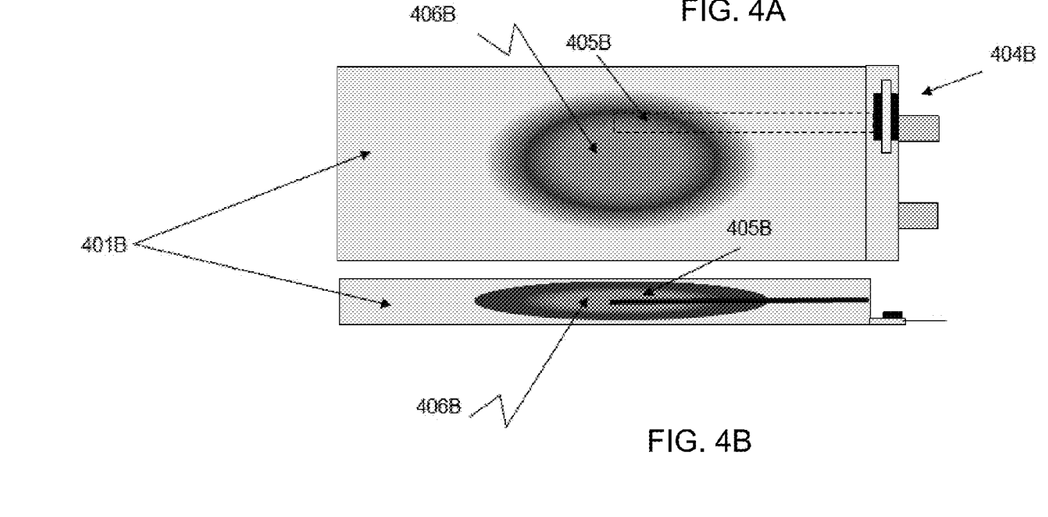

In contrast, as illustrated in FIG. 4B (again in top plan view and a side view), an embodiment provides a tab element 405B that extends into the internal of the battery cell 401B. This tab element configuration has been provided by understanding that the geometry of the particular cell leads to a concentration of the heat in the internal portion of the cell 401B. Thus, the tab element 405B extends far enough into the internal portion to be proximate to (e.g., near or in) the hottest portion of the cell. This allows the tab element 405B to conduct heat more readily to the exterior of the cell where it may be sensed by the PTC/TCO arrangement 404B.

As may be further appreciated by comparing the side views of FIG. 4A and FIG. 4B, the tab element 405A is conventionally not centrally located with respect to depth of the battery cell 401A. In contrast, an embodiment provides a tab element 405B that is more centrally located with respect to depth of the cell 401B, such as illustrated in the side view of FIG. 4B. Much the same is illustrated with respect to FIG. 4C, where an embodiment is illustrated having the tab element 405C more centrally located with respect to width of the cell 401 in the top plan view.

Figure 4C:
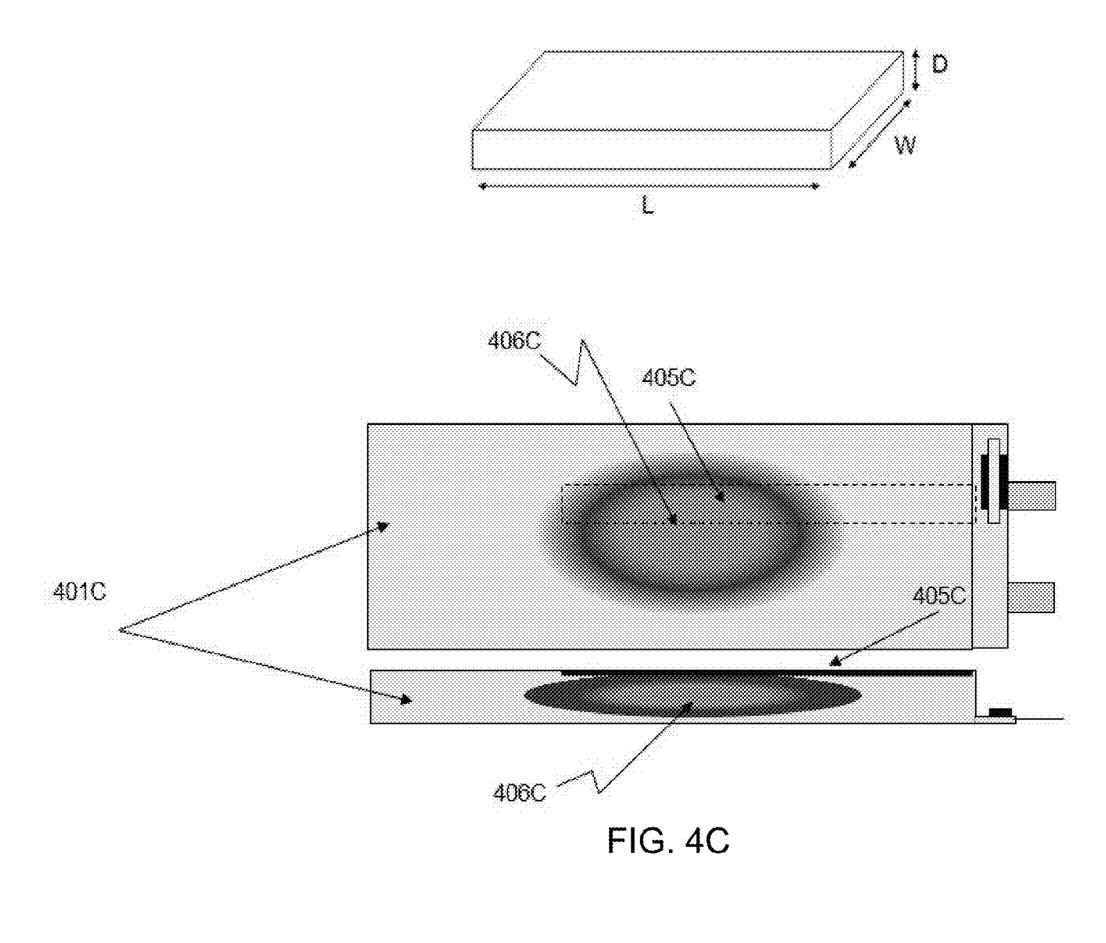

This change in placement for cells 401 of a pouch geometry improves the performance of the PTC/TCO. The battery cells 401 exhibit a temperature gradient that declines toward the edge of the cell, with a maximum temperature near the interior. This may be expressed as:

$$T_{tco} = f(|T_{edge} - T_{max}|, L, W, D)$$

where $T_{tco}$ is the temperature at the TCO, $T_{edge}$ is the temperature at the edge of the cell's 401 main heat generating region 406, and $T_{max}$ is the temperature at the maximum heat generating region, i.e., centrally located at 406 in the cells illustrated in FIG. 4(A-C). For example, for a 105 degree C. differential between the maximum temperature and the edge temperature, respectively, the temperature gradient of the cell's geometry would yield a temperature at the TCO according to the following expression:

$$T_{tco} = 110 - 5 \cdot \sqrt{\frac{L}{W}} \cdot D$$

Thus, for example as indicated in Table 1, with increasing lengths or widths of cells, the corresponding edge temperature change with the changing cell geometry.

TABLE 1

| Width | Length | Depth | $T_{edge}$ |
|---|---|---|---|
| 4 cm | 8 cm | 4 cm | 81.7 C. |
| 4 cm | 7 cm | 4 cm | 83.5 C. |
| 4 cm | 6 cm | 4 cm | 85.5 C. |
| 8 cm | 4 cm | 5 cm | 94.1 C. |
| 6 cm | 4 cm | 5 cm | 91.7 C. |
| 4 cm | 4 cm | 5 cm | 87.6 C. |

Tables 2 and 3 provide examples for pouch cells having 3 mm and 4 mm thicknesses (depth) and varying widths and heights. As indicated in Table 2, for example, for a pouch cell with 3 mm thickness, 80 mm length and 50 width the TCO trigger temperature should be less than 91 C.

TABLE 2

| | | Lengths (mm) | | | | | |
|---|---|---|---|---|---|---|---|
| | 3 mm | 30 mm | 40 mm | 50 mm | 60 mm | 70 mm | 80 mm |
| Width (mm) | 30 mm | 95.0° C. | 92.6° C. | 90.6° C. | 88.7° C. | 87.0° C. | 85.5° C. |
| | 40 mm | 97.0° C. | 95.0° C. | 93.2° C. | 91.1° C. | 90.1° C. | 88.7° C. |
| | 50 mm | 98.3° C. | 96.5° C. | 95.0° C. | 93.5° C. | 92.2° C. | 91.0° C. |
| | 60 mm | 99.3° C. | 97.7° C. | 96.3° C. | 95.0° C. | 93.7° C. | 92.6° C. |
| | 70 mm | 100.1° C. | 98.6° C. | 97.3° C. | 96.1° C. | 95.0° C. | 93.9° C. |
| | 80 mm | 100.8° C. | 99.3° C. | 98.1° C. | 97.0° C. | 96.9° C. | 95.0° C. |

TABLE 3

| | | Lengths (mm) | | | | | |
|---|---|---|---|---|---|---|---|
| | 4 mm | 30 mm | 40 mm | 50 mm | 60 mm | 70 mm | 80 mm |
| Width (mm) | 30 mm | 90.0° C. | 86.9° C. | 84.1° C. | 81.7° C. | 79.4° C. | 77.3° C. |
| | 40 mm | 92.6° C. | 90.0° C. | 87.6° C. | 85.5° C. | 83.5° C. | 81.7° C. |
| | 50 mm | 94.5° C. | 92.1° C. | 90.0° C. | 88.0° C. | 86.3° C. | 84.7° C. |
| | 60 mm | 95.8° C. | 93.6° C. | 91.7° C. | 90.0° C. | 88.3° C. | 86.9° C. |
| | 70 mm | 96.9° C. | 94.8° C. | 93.0° C. | 91.4° C. | 90.0° C. | 88.6° C. |
| | 80 mm | 97.7° C. | 95.8° C. | 94.1° C. | 92.7° C. | 91.2° C. | 90.0° C. |

Tables 4, 5 and 6 provide examples of metal properties that may be used for tab elements. As shown, copper may be used to increase the thermal conductivity of a tab element.

TABLE 4

| Nickel | | | |
|---|---|---|---|
| Specific Heat Capacity | 0.456 J/g-° C. | 0.190 | BTU/lb-° F. |
| Thermal Conductivity | 70.2 W/m-K | 487 | BTU-in/hr-ft²-° F. |

TABLE 5

| Aluminum | | | |
|---|---|---|---|
| Specific Heat Capacity | 0.900 J/g-° C. | 0.215 | BTU/lb-° F. |
| Thermal Conductivity | 210 W/m-K | 1460 | BTU-in/hr-ft²-° F. |

TABLE 6

| Copper | | | |
|---|---|---|---|
| Specific Heat Capacity | 0.385 J/g-° C. | 0.0920 | BTU/lb-° F. |
| Thermal Conductivity | 385 W/m-K | 2670 | BTU-in/hr-ft²-° F. |

In addition to material chosen for the tab element, given the different materials chosen for cell elements, there are usually various temperature drops there-between. For example, in addition to the temperature gradient between the central portion of the cell and the edge of the cell, there will be a temperature drop between copper and aluminum elements and between the TCO element and a positive tab formed of nickel. Thus, there may be for example three or more thermal conductivity drops between commonly used materials.

There may also be a time delay in temperature changes to be propagated to the edge of a cell. For example, a cell having a thickness of 3 mm may take 25 seconds to have a temperature change dissipate to the edge of the cell, whereas a cell having a thickness of 6 mm may take 45 seconds, and a cell having a thickness of 9 mm may take 65 seconds. In this way, the dimension of the cell adds to the complexity of the temperature model of the particular cell, i.e., given the cell geometry in question. By way of example, then, it may be appreciated that re-positioning a tab to be more centrally located with respect to thickness/depth may be more efficient that extending the tab, e.g., lengthwise. This is illustrated in FIG. 4(B-C). Some cells may exhibit different heat dissipation characteristics. For example, by varying the cells length while keeping the cells thickness and width constant, it may be observed that a temperature change in the central part of the cell takes longer to register and is lower in a cell that is longer as compared to that of a cell with a shorter length.

Accordingly, as has been described herein, an embodiment matches the PTC and TCO physical properties (dimension, position, material or a combination thereof) to the cell design and geometry. A predictive formula for TCO/PTC design is provided herein. In this way, an embodiment permits a change the design, geometry or placement of the tab element (e.g., positive tab) to minimize the heat discrepancy (in terms of time and magnitude) between the cell internal temperature and the tab temperature. An embodiment maximizes the PTC and TCO logic/functions by optimizing the heat transition modeling from the cell center to the tab element (e.g., temperature measured or experienced by the positive terminal).

Figure 5A:
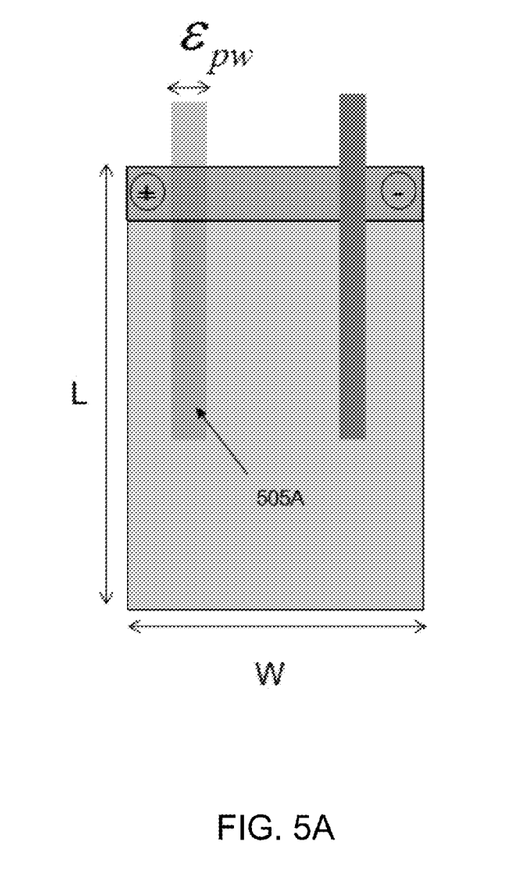
Figure 5B:
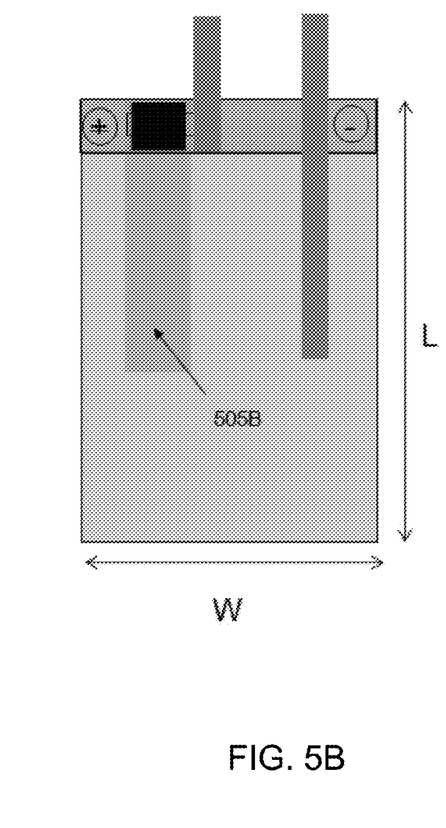

FIG. 5(A-B) illustrates an example embodiment where the dimension(s) of the tab element 505A may be changed, e.g., to use a larger (in this example, a wider) tab element 505B to reduce the heat discrepancy between the actual internal temperature of the cell and the tab element 505B, as for example compared with that of 505A. The dimension, $\epsilon_{pw}$, of the tab 504 may be given by:

$$\varepsilon_{pw} = D\sqrt{\frac{L}{W}}$$

where D is the depth/thickness of the cell, L is the length of the cell, and W is the width of the cell.

Figure 5C:
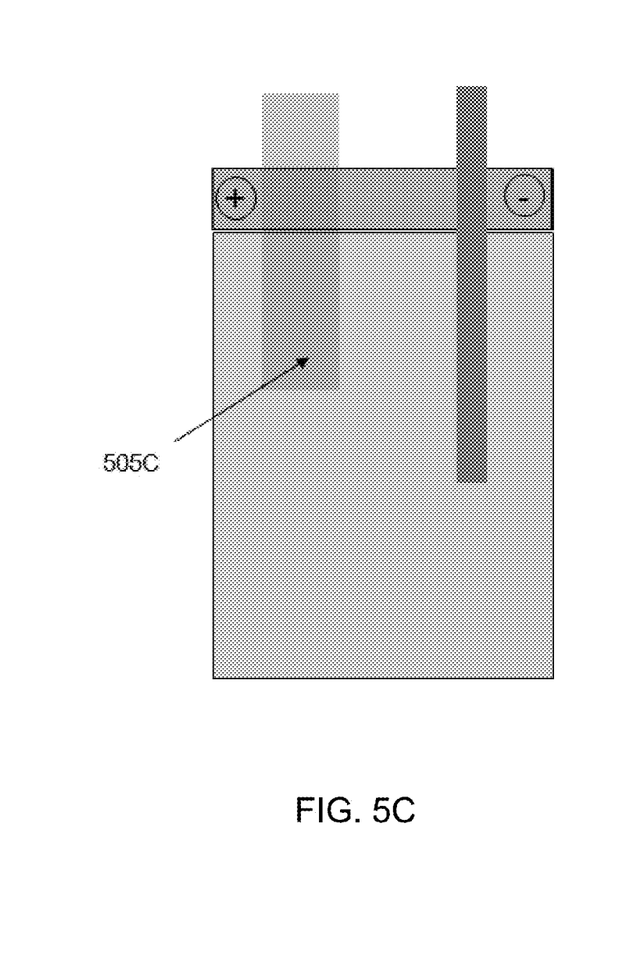
Figure 5D:
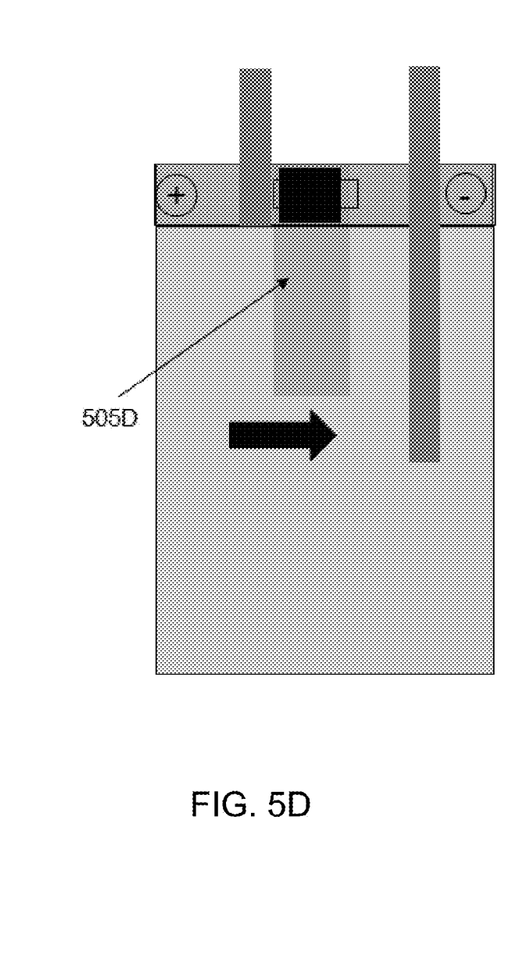
Figure 5E:
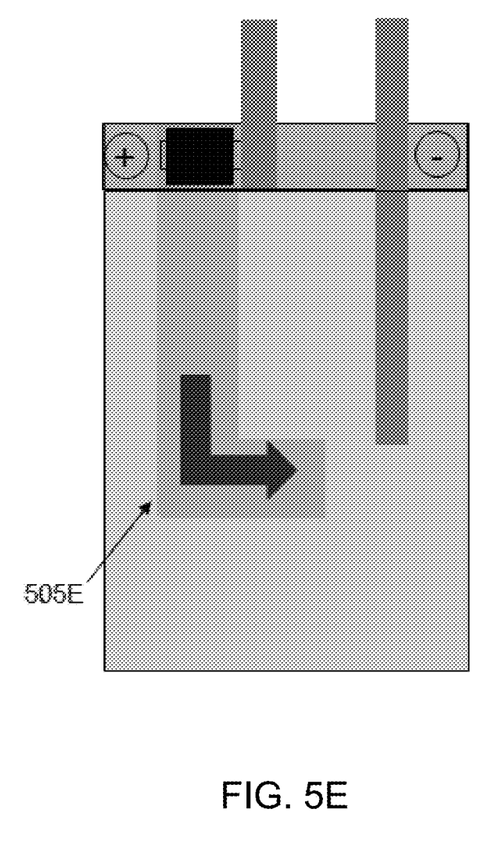

An embodiment may also position the tab element 505D (enlarged or otherwise) in a more central location, as illustrated in FIG. 5D as compared with the position of the tab element 505C of FIG. 5C. Again, this permits a more proximate location for tab element 505D with respect to the predicted or observed geometric center of heat for a particular cell's geometry. In another embodiment, illustrated by way of example in FIG. 5E, a tab element 505E may be shaped or formed, e.g., in the L-shaped arrangement shown for tab element 5E in the non-limiting example, such that the tab element 505E is directed to the geometric heat center for the cell.

It will be appreciated that although the foregoing has focused on considering one unitary heat generating material for a given cell, different cells may employ different stacking and winding configurations such that added or different affects are produced on the heat model for a given cell. For example, an embodiment may take into account a stacking or winding configuration for a cell or group of cells in determining a heating model for a cell and thus the placement of a heat conducting/sensing element. In this regard, it will be appreciated that in many cases the additional influence of the winding or stacking arrangement may be minimal or substantial, depending on the configuration chosen. For example, for a stacking configuration such as that shone in FIG. 6A, it can be observed that the heat will be exchanged between the components as illustrated by the arrows in FIG. 6B.

Figure 6A:
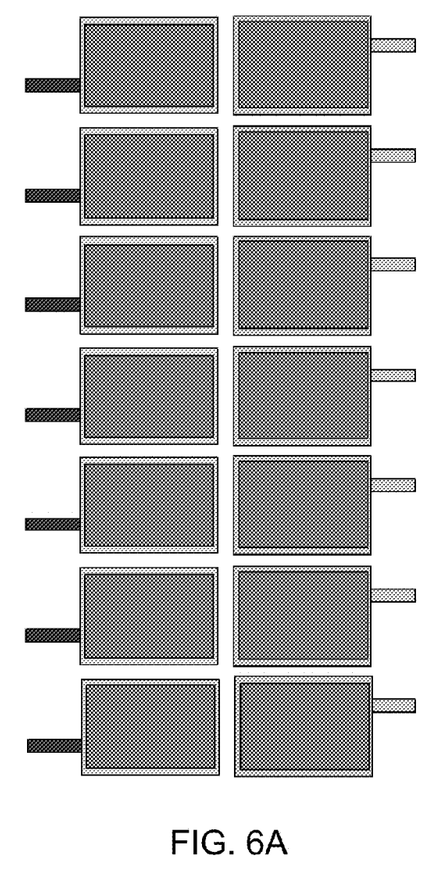
Figure 6B:
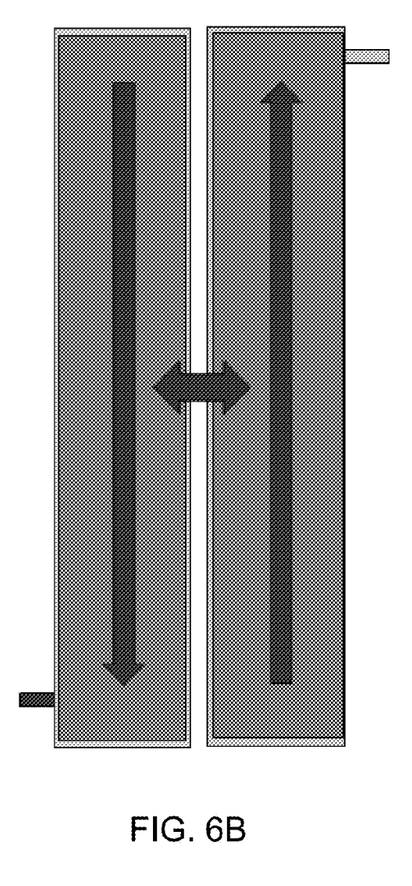

The contributions of neighboring elements (cathodes and anodes) in such a stacking configuration as illustrated in FIG. 6A may be estimated as:

$$\Delta H(A) >> \Sigma \delta h(A)$$

$$\Delta H(C) >> \Sigma \delta h(C)$$

$$\Delta H(EX) >> \Sigma \delta h(EX)$$

where the change in heat at the anode (A) is much greater than the cumulative changes in heat at the other anodes of the configurations, with similar results expected for the cathodes (C) and component to component exchange (EX).

Figure 6C:
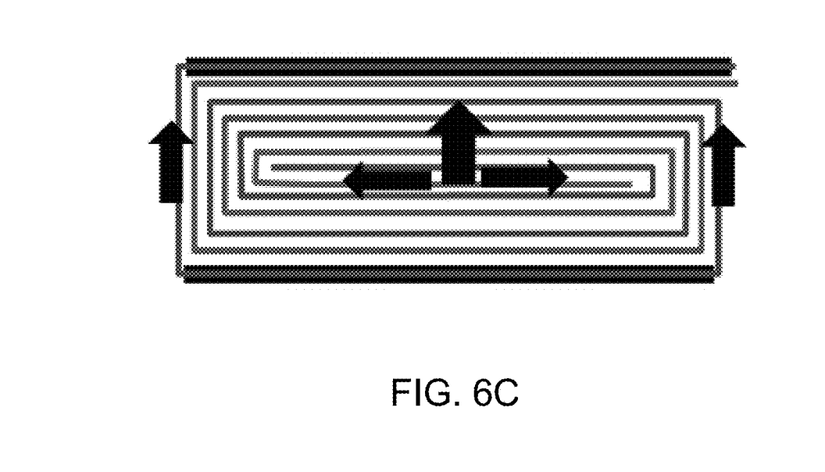
Figure 6D:
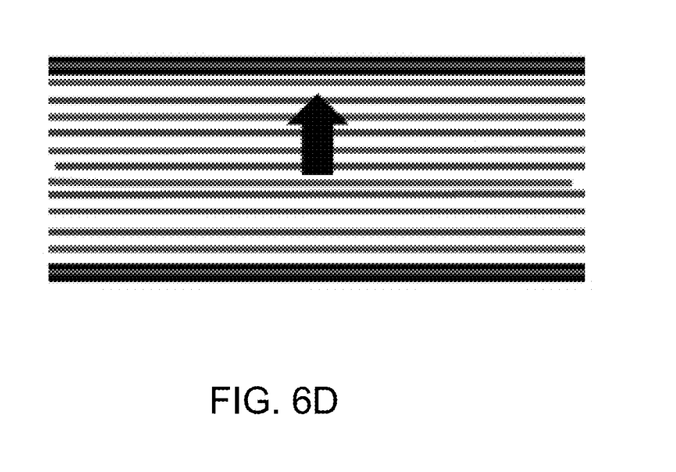

Similarly, the winding configuration may influence the heat model of the battery cell. Illustrated in FIG. 6(C-D) are examples of winding configurations that may be utilized in cells, e.g., such as those illustrated in FIG. 6A and FIG. 6B. Again, the arrows in FIG. 6C and FIG. 6D indicate the modeled heat dissipation in the example windings, which may be taken into account when determining a heat model for a battery cell.

In an embodiment, the cell geometry may thus influence the choice of tab element material, dimension and positioning. Furthermore, the battery cell's logic or settable elements (e.g., TCO fuse) may be modified to trigger at different temperatures given a known cell geometry and heat model therefor.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A battery cell, comprising:
one or more contacts;
a material providing output power to a device via the one or more contacts; and
a tab element forming a part of a temperature cutoff mechanism;
the tab element being thermally coupled to the material and conducting heat generated by the material; and
the tab element being positioned proximate to a geometrically determined heat center.

2. The battery cell of claim 1, wherein the tab element extends substantially to the geometrically determined heat center in a dimension selected from the group consisting of length, width and depth.

3. The battery cell of claim 2, wherein the tab element extends substantially to the geometrically determined heat center in a length dimension of the battery cell.

4. The battery cell of claim 2, wherein the tab element extends substantially to the geometrically determined heat center in a width dimension of the battery cell.

5. The battery cell of claim 2, wherein the tab element extends substantially to the geometrically determined heat center in both a length dimension and a width dimension of the battery cell.

6. The battery cell of claim 1, wherein the tab element extends past a middle point of the battery cell.

7. The battery cell of claim 6, wherein the tab element consists of a substantially linear element.

8. The battery cell of claim 6, wherein the tab element is offset from the geometric center of the battery cell.

9. The battery cell of claim 1, wherein the tab element includes an extension that is shaped towards the geometrically determined heat center of the battery cell.

10. The battery cell of claim 1, wherein the tab element includes a characteristic selected based on thermal conductivity variation between elements forming the thermal cut off fuse.

11. The battery cell of claim 10, wherein the characteristic is a characteristic selected from the group consisting of a tab element material, a tab element dimension, and a tab element offset.

12. An apparatus, comprising:
a battery cell;
an input device;
a processor; and
a memory;
wherein the memory, the input device and the processor are operatively coupled to the battery cell;
the battery cell, comprising:
one or more contacts;
a material providing output power to an apparatus component via the one or more contacts; and
a tab element forming a part of a temperature cutoff mechanism;
the tab element being thermally coupled to the material and conducting heat generated by the material; and
the tab element being positioned proximate to a geometrically determined heat center.

13. The apparatus of claim 12, wherein the tab element extends substantially to the geometrically determined heat center in a dimension selected from the group consisting of length, width and depth.

14. The apparatus of claim 13, wherein the tab element extends substantially to the geometrically determined heat center in a length dimension of the battery cell.

15. The apparatus of claim 13, wherein the tab element extends substantially to the geometrically determined heat center in a width dimension of the battery cell.

16. The apparatus of claim 13, wherein the tab element extends substantially to the geometrically determined heat center in both a length dimension and a width dimension of the battery cell.

17. The apparatus of claim 12, wherein the tab element extends past a middle point of the battery cell.

18. The apparatus of claim 17, wherein the tab element consists of a substantially linear element.

19. The apparatus of claim 17, wherein the tab element is offset from the geometric center of the battery cell.

20. The apparatus of claim 12, wherein the tab element includes an extension that is shaped towards the geometrically determined heat center of the battery cell.

21. A battery, comprising:
a cell, including:
one or more contacts;
a material providing output power to a device via the one or more contacts; and
a tab element forming a part of a temperature cutoff mechanism;
the tab element being thermally coupled to the material and conducting heat generated by the material; and
the tab element being positioned proximate to a geometrically determined heat center.

22. A battery pack, comprising:
a plurality of battery cells, each cell including:
one or more contacts;
a material providing output power to a device via the one or more contacts; and
a tab element forming a part of a temperature cutoff mechanism;
the tab element being thermally coupled to the material and conducting heat generated by the material; and
the tab element being positioned proximate to a geometrically determined heat center of a cell considering the arrangement of cells within the battery pack.

23. A system, comprising:
a battery pack;
an input device;
a processor; and
a memory;
wherein the memory, the input device and the processor are operatively coupled to the battery pack;
the battery pack, comprising:
a plurality of battery cells, each cell including:
one or more contacts;
a material providing output power to a component via the one or more contacts; and
a tab element forming a part of a temperature cutoff mechanism;
the tab element being thermally coupled to the material and conducting heat generated by the material; and
the tab element being positioned proximate to a geometrically determined heat center of a cell considering the arrangement of cells within the battery pack.

* * * * *